H. N. EVERSOLE, H. R. CAWTHON & H. I. OWEN.
MEANS TO DEFLATE INNER TUBES.
APPLICATION FILED FEB. 1, 1916.
1,229,734.
Patented June 12, 1917.
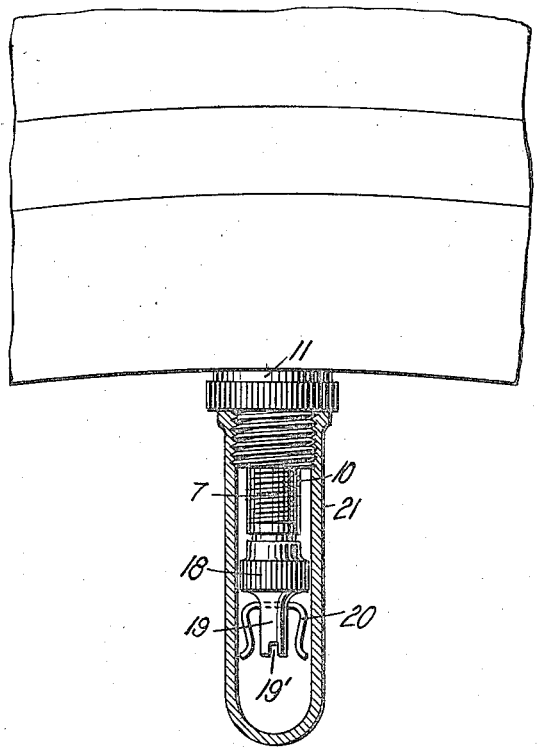
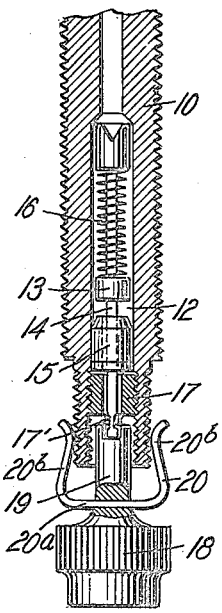
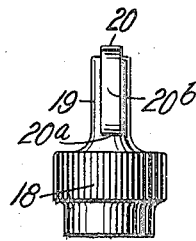
WITNESSES
INVENTORS
H.N.Eversole
H.R.Cawthon
H.I.Owen
BY
ATTORNEYS

UNITED STATES PATENT OFFICE.

HENRY NORTH EVERSOLE, HUGH R. CAWTHON, AND HENRY ISAAC OWEN, OF FULTON, MISSOURI; SAID CAWTHON AND SAID OWEN ASSIGNORS TO SAID HENRY NORTH EVERSOLE AND FRANK R. EVERSOLE, OF ST. LOUIS, MISSOURI.

MEANS TO DEFLATE INNER TUBES.

1,229,734.  Specification of Letters Patent.  Patented June 12, 1917.

Application filed February 1, 1916. Serial No. 75,539.

*To all whom it may concern:*

Be it known that we, HENRY N. EVERSOLE, HUGH R. CAWTHON, and HENRY I. OWEN, citizens of the United States, and residents of Fulton, in the county of Callaway and State of Missouri, have invented a new and Improved Means to Deflate Inner Tubes, of which the following is a full, clear, and exact description.

This invention relates to pneumatic tires and has particular reference to the filling tubes for such tires.

Among the objects of the invention is to provide a means whereby the valve of a pneumatic tire may be held open without care or attention on the part of the operator until the inner tube is deflated.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings in which like reference characters designate the same parts in the several views, and in which—

Figure 1 is a side elevation of a portion of a wheel rim and tire equipped with our improvement, the dust cap portion being shown in section;

Fig. 2 is a vertical sectional view indicating the action of the improvement; and Fig. 3 is an elevation of the improved cap at right angles to the position of the same in Fig. 1.

The main portions of the valve disclosed herein are of a well known type and include the main tube 10 threaded externally for the lock nut 11 and counterbored at 12 to receive the valve mechanism proper. The valve mechanism includes a valve 13 connected to a valve stem 14 and adapted to coöperate with a bushing 15 by virtue of the spring 16, said valve stem projecting outwardly through a nut 17 tapped into the outer end of the tube. The nut 17 is provided at its outer end with a diametrically arranged rib 17' whereby the nut is manipulated into or out of the end of the tube.

The valve cap 18 as shown in Fig. 1 fits over the reduced and externally threaded tip end of the tube 10, and in this position serves to retain the air and to exclude dust or dirt from the valve. This cap carries at its outer end a central tip 19 designed to ordinarily serve two purposes. The tip 19 is adapted to be projected into the end of the tube and by bearing against the outer end of the valve stem 14 the valve 13 is unseated against the force of the spring 16 to either loosen the valve or to permit the escape of air from the tire. This tip 19 is also provided with a transverse groove 19' which, by coöperation with the rib 17', enables the operator to screw the nut 17 in or out.

The air passage through this valve mechanism is necessarily comparatively restricted, and hence in the case of large tires the time required for deflation is quite material, especially in a busy shop where other duties are to be performed. We, therefore, improve the mechanism above described in such a manner as to make it possible for the tip end 19 of the valve cap to be self-retained in the deflating position, holding the valve 13 unseated. Our improvement specifically stated comprises the application of a clip 20 to the cap in such a manner as to engage over the threaded end of the tube. This clip is shown as formed from flat spring material and substantially U-shaped, the same comprising a central bar 20$^a$ passing through the tip of the cap and terminating in side ends or legs 20$^b$, the extreme points or ends of which are deflected outwardly somewhat to facilitate the application of the cap to the end of the tube. The clip 20 as shown is not greater in width than the main portion of the cap and hence does not interfere in any manner with the usual outer guard or dust cap 21 over the valve in the usual manner. Neither does the clip interfere in any manner with the usual and old functions of the cap and its tip. With the improvement added to the cap, when it is desired to deflate the tire, the cap is removed from the tube and inverted, the tip end thereof being forced directly into the outer end of the tube. This tip bearing against the valve stem 14 unseats the valve, and the leg portions of the clip, grasping frictionally over the exterior of the tip end of the tube, serve to hold the cap in this position, the friction being superior to the force of the spring 16 tending to close the valve. The cap thus will be held in deflating position as long as necessary, but may be pulled by the operator directly from such position when the tire is deflated.

We claim:—

The combination with a valve for pneumatic tires, of a cap for closing and protecting the valve, said cap having at its outer end a tip for unseating of the valve, said tip having an aperture therein and a substantially U-shaped clip, having the portion connecting its members secured in the aperture of the tip with said members projecting at opposite sides of the tip and in the direction of the end thereof.

HENRY NORTH EVERSOLE.
HUGH R. CAWTHON.
HENRY ISAAC OWEN.

Witnesses:
D. W. HERRING,
NICK T. CAVE.